United States Patent
Cudak et al.

(10) Patent No.: US 9,811,133 B2
(45) Date of Patent: *Nov. 7, 2017

(54) POWER MANAGEMENT FOR BATTERY-POWERED DEVICES

(71) Applicant: INTERNATIONAL BUSINESS MACHINES CORPORATION, Armonk, NY (US)

(72) Inventors: Gary D. Cudak, Wake Forest, NC (US); Christopher J. Hardee, Raleigh, NC (US); Sarbajit K. Rakshit, Kolkata (IN); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,385

(22) Filed: Aug. 31, 2015

(65) Prior Publication Data

US 2016/0062429 A1    Mar. 3, 2016

Related U.S. Application Data

(63) Continuation of application No. 14/468,972, filed on Aug. 26, 2014.

(51) Int. Cl.
*G06F 1/26* (2006.01)
*G06F 1/32* (2006.01)
(Continued)

(52) U.S. Cl.
CPC .......... *G06F 1/26* (2013.01); *G06F 1/263* (2013.01); *G06F 1/266* (2013.01); *G06F 1/28* (2013.01); *G06F 1/30* (2013.01); *G06F 9/4893* (2013.01)

(58) Field of Classification Search
None
See application file for complete search history.

(56) References Cited

U.S. PATENT DOCUMENTS 5,652,502 A    7/1997    Van Phuoc et al.
7,260,728 B2   8/2007    Chang et al.
(Continued)

FOREIGN PATENT DOCUMENTS

WO    WO2013133845    *    9/2013

OTHER PUBLICATIONS

List of IBM Patents or Patent Applications Treated as Related, Aug. 28, 2015, 2 pages.

(Continued)

*Primary Examiner* — Fahmida Rahman
(74) *Attorney, Agent, or Firm* — Law Office of Jim Boice (57) ABSTRACT

A method enables the sharing of power between multiple battery-powered electronic devices. A determination is made as to which tasks, from multiple pending tasks on multiple battery-powered electronic devices, are to be selected for completion. A power requirement for each of the tasks that have been selected for completion is determined, and the tasks are prioritized. One or more processors calculates a quantity of amp-hours that are available to charge batteries on the battery-powered electronic devices. A power distribution hardware controller then distributes available amp-hours from the battery source to one or more of the battery-powered electronic devices based on the priority of the tasks.

19 Claims, 7 Drawing Sheets

(51) Int. Cl.
*G06F 9/48* (2006.01)
*G06F 1/28* (2006.01)
*G06F 1/30* (2006.01)

(56) References Cited

U.S. PATENT DOCUMENTS

| | | | |
|---|---|---|---|
| 7,443,057 B2 | 10/2008 | Nunally | |
| 8,135,443 B2 | 3/2012 | Aleksic et al. | |
| 8,231,233 B2 | 7/2012 | Schuler et al. | |
| 8,294,427 B2 | 10/2012 | Inoue et al. | |
| 8,392,735 B2 | 3/2013 | Mucignat et al. | |
| 8,438,412 B1 | 5/2013 | Givoly | |
| 2005/0125700 A1* | 6/2005 | Chang | G06F 9/4893 713/300 |
| 2005/0256610 A1* | 11/2005 | Orita | G05D 1/0088 700/248 |
| 2009/0259635 A1* | 10/2009 | Fukazawa | G06Q 30/02 |
| 2010/0088707 A1 | 4/2010 | Corn et al. | |
| 2010/0145643 A1* | 6/2010 | Katpelly | G06F 1/3203 702/63 |
| 2010/0253281 A1* | 10/2010 | Li | H02J 7/0027 320/108 |
| 2012/0005490 A1 | 1/2012 | Goraczko et al. | |
| 2012/0047379 A1* | 2/2012 | Chen | G06F 1/3212 713/320 |
| 2012/0130660 A1 | 5/2012 | Neumeyer | |
| 2012/0134517 A1 | 5/2012 | Sato | |
| 2012/0210325 A1 | 8/2012 | De Lind et al. | |
| 2013/0106364 A1 | 5/2013 | Baarman et al. | |
| 2014/0035380 A1 | 2/2014 | Stevens et al. | |
| 2014/0055087 A1 | 2/2014 | Causey et al. | |
| 2015/0084584 A1* | 3/2015 | Monks | H02J 7/025 320/108 |
| 2016/0011575 A1 | 1/2016 | Liu et al. | |

OTHER PUBLICATIONS

U.S. Appl. No. 14/468,972 Non-Final Office Action dated Jun. 6, 2016.

* cited by examiner

POWER MANAGEMENT FOR BATTERY-POWERED DEVICES

The present application is a continuation of U.S. patent application Ser. No. 14/468,972 filed on Aug. 26, 2014, and entitled "Power Management For Battery-Powered Devices," which is incorporated herein by reference in its entirety.

BACKGROUND

The present disclosure relates to the field of electronic devices, and specifically to battery-powered electronic devices. Still more particularly, the present disclosure relates to allocating power to battery-powered electronic devices.

Many electronic devices now run on battery power. Examples of such battery-powered electronic devices include, but are not limited to, cellular phones, smart phones, laptop computers, tablet computers, Global Positioning System (GPS) navigation devices, etc. Since such devices are reliant upon their local (internal) batteries, their operating time is limited to the amount of electricity that is stored within their batteries.

SUMMARY

In one embodiment of the present invention, a method enables the sharing of power between multiple battery-powered electronic devices. A determination is made as to which tasks, from multiple pending tasks on multiple battery-powered electronic devices, are to be selected for completion. A power requirement for each of the tasks that have been selected for completion is determined, and the tasks are prioritized. One or more processors calculates a quantity of amp-hours that are available to charge batteries on the battery-powered electronic devices. A power distribution hardware controller then distributes available amp-hours from the battery source to one or more of the battery-powered electronic devices based on the priority of the tasks.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
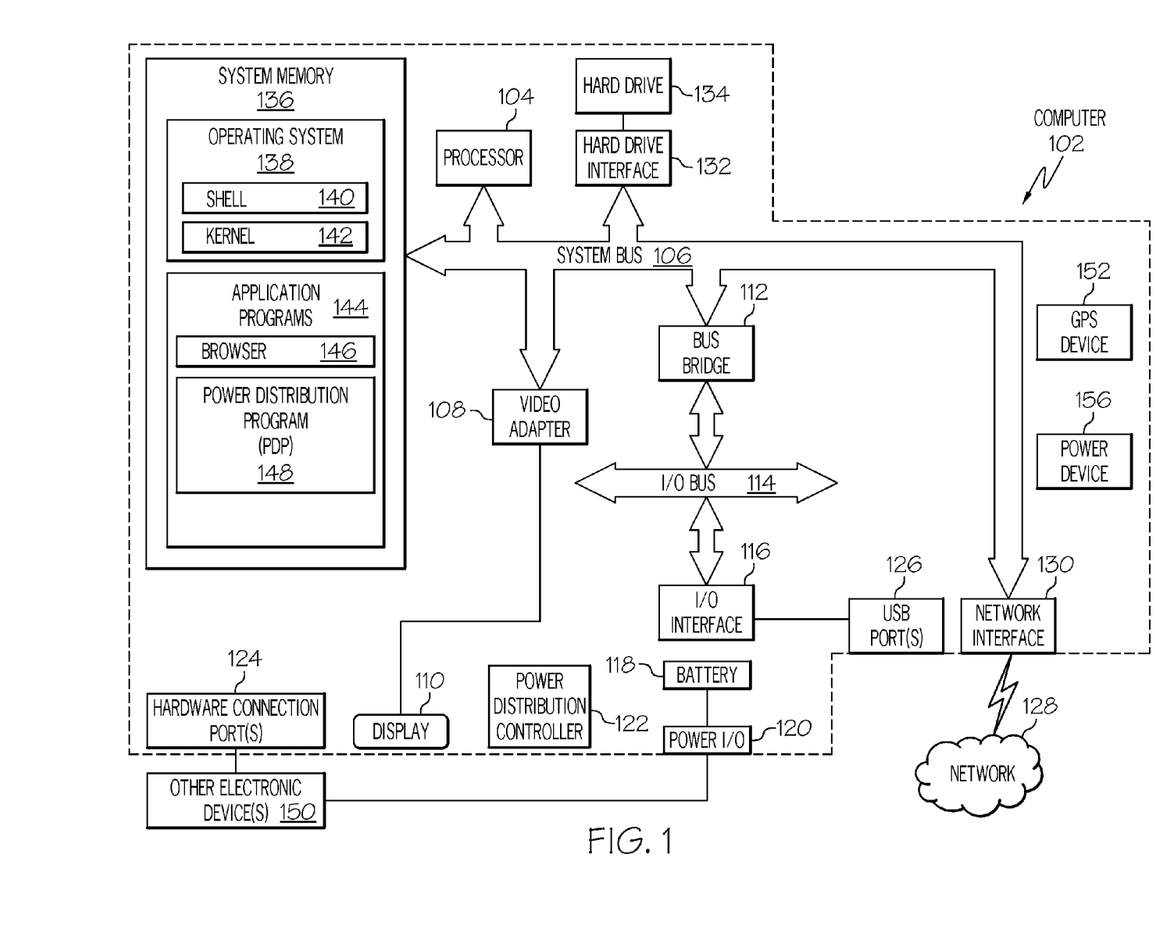
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention.

Exemplary electronic device 102, which in one or more embodiments is a battery-powered device that relies on an internal battery 118 for power, includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including external USB port(s) 126.

As depicted, electronic device 102 is able to communicate with other electronic devices and/or computers and/or servers using a network interface 130. Network interface 130 is a hardware network interface, such as a network interface card (NIC), etc. Network 128 may be an external network such as the Internet, or an internal network such as an Ethernet or a virtual private network (VPN), or a wireless local area network (WLAN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in electronic device 102. This volatile memory includes additional higher levels of volatile memory (not shown), including, but not limited to, cache memory, registers and buffers. Data that populates system memory 136 includes electronic device 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., electronic device 102) to send and receive network messages to the Internet using hypertext transfer protocol (HTTP) messaging, thus enabling communication with other computer systems.

Application programs 144 in electronic device 102's system memory also include a Power Distribution Program (PDP) 148. PDP 148 includes code for implementing the processes described below, including those described in FIGS. 2-6.

Also within electronic device 102 is a power distribution controller 122, which is a hardware device that, via a hardware switch such as power Input/Output (I/O) 120, controls power going into battery 118 (from a charging source) and out to another battery (a receiving battery) to/from other electronic device(s) 150, as described in further detail below. Thus, power I/O 120 allows electronic device 120 to be in power communication with the other electronic device(s) 150.

Also within electronic device 102 are hardware connection port(s) 124, which are electrically connectable to other electronic device(s) 150, which have some or all of the components depicted for electronic device 102. Hardware connection port(s) 124 allow the electronic device 102 to be in data communication with the other electronic device(s) 150.

Note that in one or more embodiments of the present invention, electronic device 102 also includes a Global Positioning System (GPS) device 152, which is a hardware device capable of triangulating a physical position of electronic device 102 from signals received from GPS satellites above Earth. In one or more embodiments, GPS device 152 is also able to provide travel directions to a selected physical location.

Note that in one or more embodiments of the present invention, power is also provided to one or more of the components depicted in computer 102 from a power device 156. In various embodiments, power device 156 includes a transformer for lowering/raising incoming voltage (e.g., from a power source— not shown), a converter for converting incoming power from one format into another (i.e., converting alternating current into direct current), power storage devices for storing power (i.e., batteries, capacitors, etc.), etc.

Figure 2:
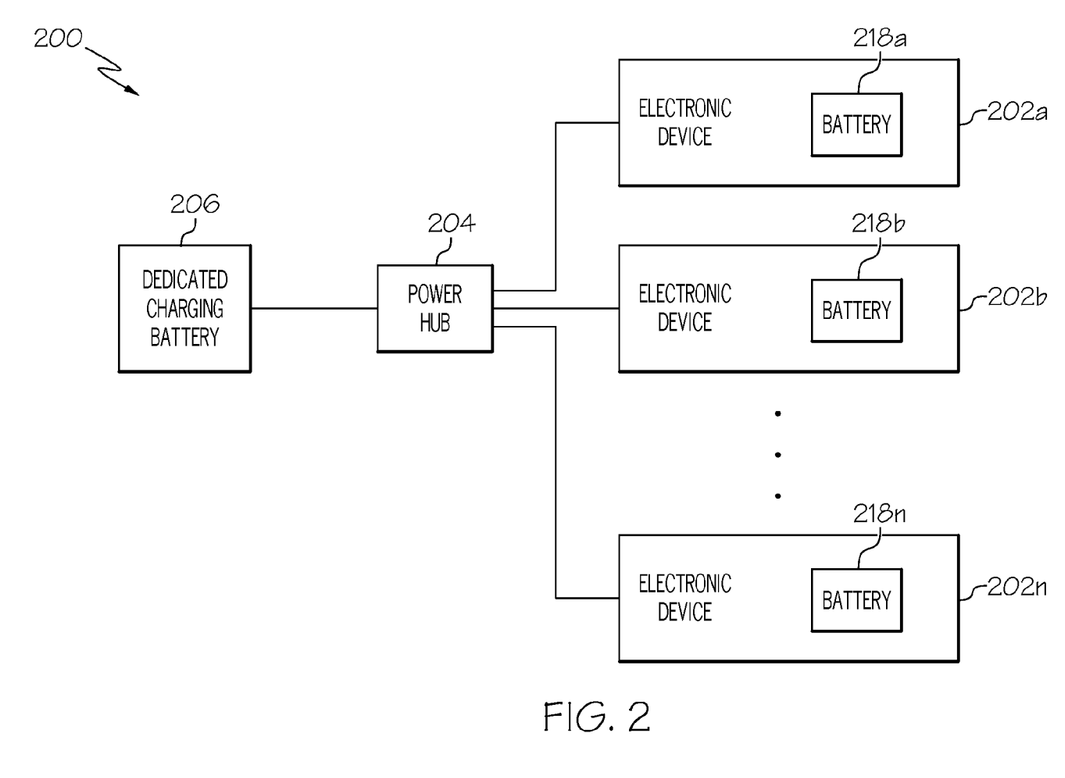
FIG. 2 illustrates an exemplary network of electrically connected battery-powered electronic devices.

Note further that in one or more embodiments of the present invention, the electronic devices depicted herein (e.g., electronic device 102 and other electronic devices 150 depicted in FIG. 1 and/or the electronic devices 202a-202n and power hub 204 depicted in FIG. 2) are battery powered devices, which rely on internal battery supplies for operation.

Note further that some or all of the architecture depicted for electronic device 102 may be utilized by other electronic device(s) 150 shown in FIG. 1, as well as the electronic devices 202a-202n and power hub 206 depicted in FIG. 2.

Note further that the hardware elements depicted in electronic device 102 are not intended to be exhaustive, but rather are representative to highlight essential components required by the present invention. For instance, electronic device 102 may include alternate memory storage devices such as magnetic cassettes, digital versatile disks (DVDs), Bernoulli cartridges, and the like. These and other variations are intended to be within the spirit and scope of the present invention.

Note that the terms "power", "battery power", "amp-hours", and "electrons" are used interchangeably throughout this disclosure to describe stored direct current (DC) electricity in a battery. That is, a battery is essentially a device for storing electrical energy. This electrical energy (i.e., electrons) may be colloquially referred to as power, even though the term "power" is more accurately used by electrical engineers and physicists to describe "voltage times current" (P=V*I). "Electrons" is a physically accurate description of what is stored in a battery, but a more standardized term to describe electricity stored in a battery is an "amp-hour", which describes the quantity of electrons (amperes or amperage) that can pass a point on a wire in an hour.

Similarly, the terms "battery-powered device" and "battery-powered electronic device" are used interchangeably to describe a portable electronic device that is powered by a battery.

With reference now to FIG. 2, an exemplary network 200 of electrically connected battery-powered electronic devices 202a-202n (where "n" is an integer) is presented. Electronic devices 202a-202n are battery powered devices, each of which are powered by a local (e.g., internal) battery pack, which are equivalent to battery 118 shown in FIG. 1, and which are depicted in FIG. 2 as batteries 218a-218n. A power hub 204 is a hardware device that is capable of intelligently/selectively distributing power to the electronic devices 202a-202n from a battery source. In one embodiment, this battery source is a dedicated charging battery 206, which is a battery that has a limited amount of stored power, but which has no processing logic. That is, dedicated charging battery 206 is merely a battery pack that can be coupled to the electronic devices 202a-202n, either directly or via the power hub 204, in order to provide additional charge (e.g., electrons) to the batteries 218a-218n.

Figure 3:
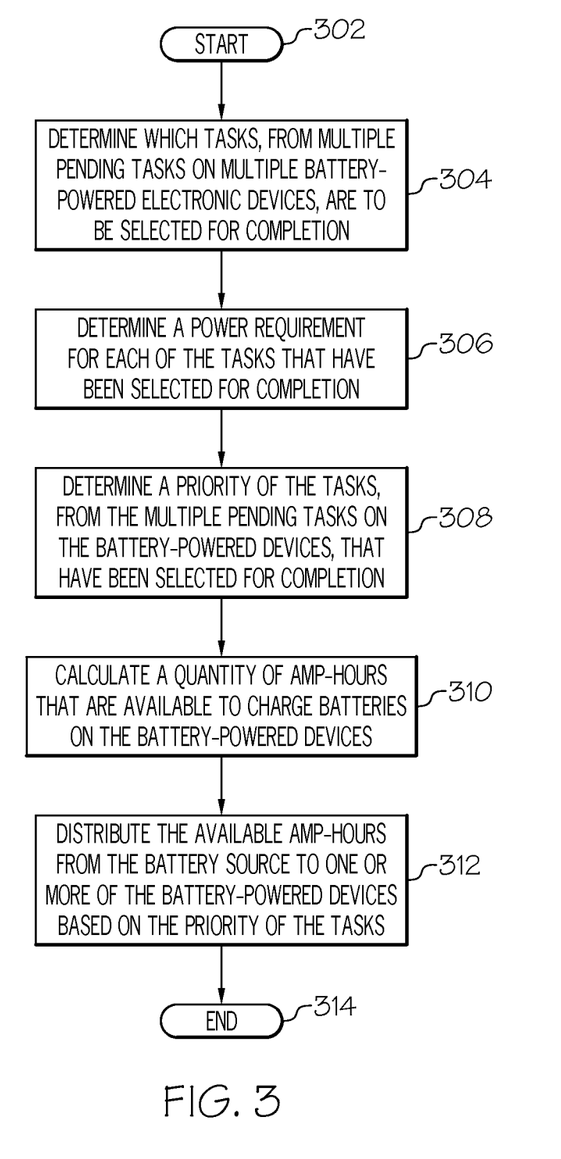
FIG. 3 is a high-level flowchart of one or more steps performed by one or more processors to distribute battery power to battery-powered electronic devices and/or to share battery power between battery-powered electronic devices.

With reference now to FIG. 3, a high-level flowchart of one or more steps performed by one or more processors and/or other hardware devices to distribute battery power to battery-powered electronic devices and/or to share battery power between battery-powered electronic devices is presented.

After initiator block 302, a determination is made as to which tasks, from multiple pending tasks on multiple battery-powered devices, are to be selected for completion (block 304). For example, consider FIG. 4, which depicts an exemplary user interface 402. Assume for exemplary purposes that user interface 402 is on one of the battery-powered electronic devices 202a-202n depicted in FIG. 2. As depicted and for explanatory purposes, this battery-powered electronic device is identified a "Tablet A". Currently running (or alternatively, scheduled for future execution) are multiple tasks, identified as tasks 404a-404p (where "p" is an integer), which are depicted in cells 420. As depicted, each of the tasks 404a-404p are represented by a separate block, which is visually coded to indicate a completion status of a particular task. For example, task 404i has not yet started completed (i.e., instructions in an application that perform task 404i have not yet started executing), while task 404e has finished (i.e., instructions in an application that perform task 404e have completed execution). Similarly, other tasks, such as task 404a, are partially complete (i.e., instructions in an application that perform task 404a are still in the process of executing).

Returning to FIG. 3, a determination is then made as to how much power is needed to complete each of the tasks that have been selected for completion (block 306). Returning to FIG. 4, task 404e obviously has no power requirements to complete, since it is already finished. However, other tasks (e.g., 404a, 404b, etc.) still have instructions to execute, and thus need additional power from the local battery. Unfortunately, however, the local battery (battery 218a in the battery-powered electronic device 202a shown in FIG. 2) is nearly depleted, as indicated by battery power indicator 406, which depicts how much power remains within battery 218a. That is, section 408 shows how much empty space (i.e., capacity to store amp-hours) is in battery 218a, and section 410 shows how much power (i.e., electrons, amp-hours, etc.) are available from battery 218a.

Figure 4:
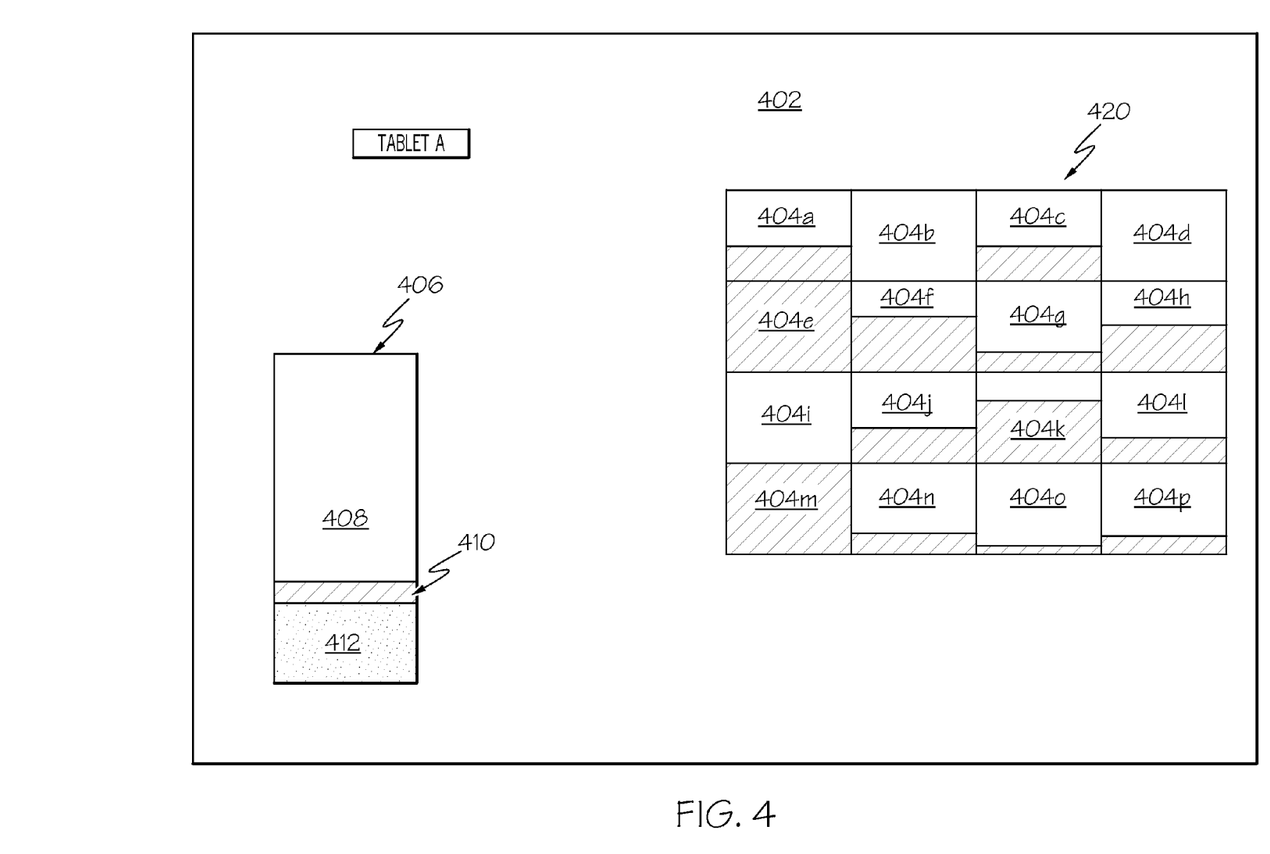
FIG. 4 depicts an exemplary user interface depicting tasks on a battery-powered electronic device.

Note that a reserve level is depicted in section 412 of battery power indicator 406. This section is for reserve power, which may be reserved according to various rules. For example, a rule may require that battery 218a always have enough power to properly shut down the battery-powered electronic device 202a. Another rule may require that battery 218a always have enough power for one hour of communication ability (e.g., power to keep a cell phone on, assuming that battery-powered electronic device 202a is a cell phone). Another rule may require that battery 218a always have enough power to communicate with power hub 204 shown in FIG. 2, in order to download more power to battery 218a.

Returning to FIG. 3, a determination is made regarding a priority of the tasks, from the multiple pending tasks on the battery-powered electronic devices, which have been selected for completion (block 308). That is, there may not be enough power to perform all of the tasks 404a-404p shown in cells 420 in FIG. 4. Prioritizing such tasks may be according to various rules/parameters.

For example, in one embodiment the tasks 404a-404p are prioritized according to a user-input from a user of the battery-powered device. That is, assume that each of the tasks 404a-404p are identified and/or described. Thus, task 404a may be a task to find directions to a local hospital (assuming that Tablet A— battery-powered electronic device 202a has GPS navigation abilities from a GPS device such as GPS device 152 depicted in FIG. 1). In order to select task 404a as the most important (highest priority) task, a user may simply touch the cell for task 404a. Thereafter, the next task that the user touches (e.g., the cell for task 404k) indicates that task (e.g., task 404k) has the next highest priority for execution. Thus, a user-input identifies not only which tasks, from multiple pending tasks, are to be selected for completion on the specific battery-powered device, but also their priority relative to one another.

Note that the selection and prioritization of task completion may cross different battery-powered electronic devices. For example, assume that electronic device 202a depicted in FIG. 2 has four pending tasks (i.e., T1, T2, T3, T4), and electronic device 202b also has four pending tasks (i.e., T5, T6, T7, T8). Assume further that each of the combined eight pending tasks (from T1-T8) has been assigned a relative priority. For example, T1 may have the highest priority, T6 may have the next highest priority, T5 may have the next highest priority, T2 may have the next highest priority, etc. Thus, when allocating power recharge the batteries in electronic device 202a and electronic device 202b, all of these priority levels are considered.

In one embodiment, task priorities are set subjectively by a user (as just described). In another embodiment, however, task priorities are set by rules. For example and as described above, one task in a first battery-powered electronic device may be to obtain GPS directions to a hospital. Another task in the first battery-powered electronic device (or a second battery-powered electronic device) may be to check on postings on a social network. A rule would state that obtaining directions to a hospital (e.g., during a medical emergency) has a high priority level (e.g., "10"), while checking for postings on a social network has a lower priority level (e.g., "1"). Thus, power would be allocated to the battery-powered electronic device running the GPS task before allocating power to the battery-powered electronic device running the social network task.

Returning now to FIG. 3, as described in block 310, a quantity of amp-hours that are available to charge batteries on the battery-powered electronic devices is calculated. This available power (amp-hours) may be from a dedicated charging battery (e.g., dedicated charging battery 206 shown in FIG. 2) or it may be from a battery within another battery-powered electronic device (e.g., one or more of the electronic devices 202a-202n shown in FIG. 2).

Figure 5:
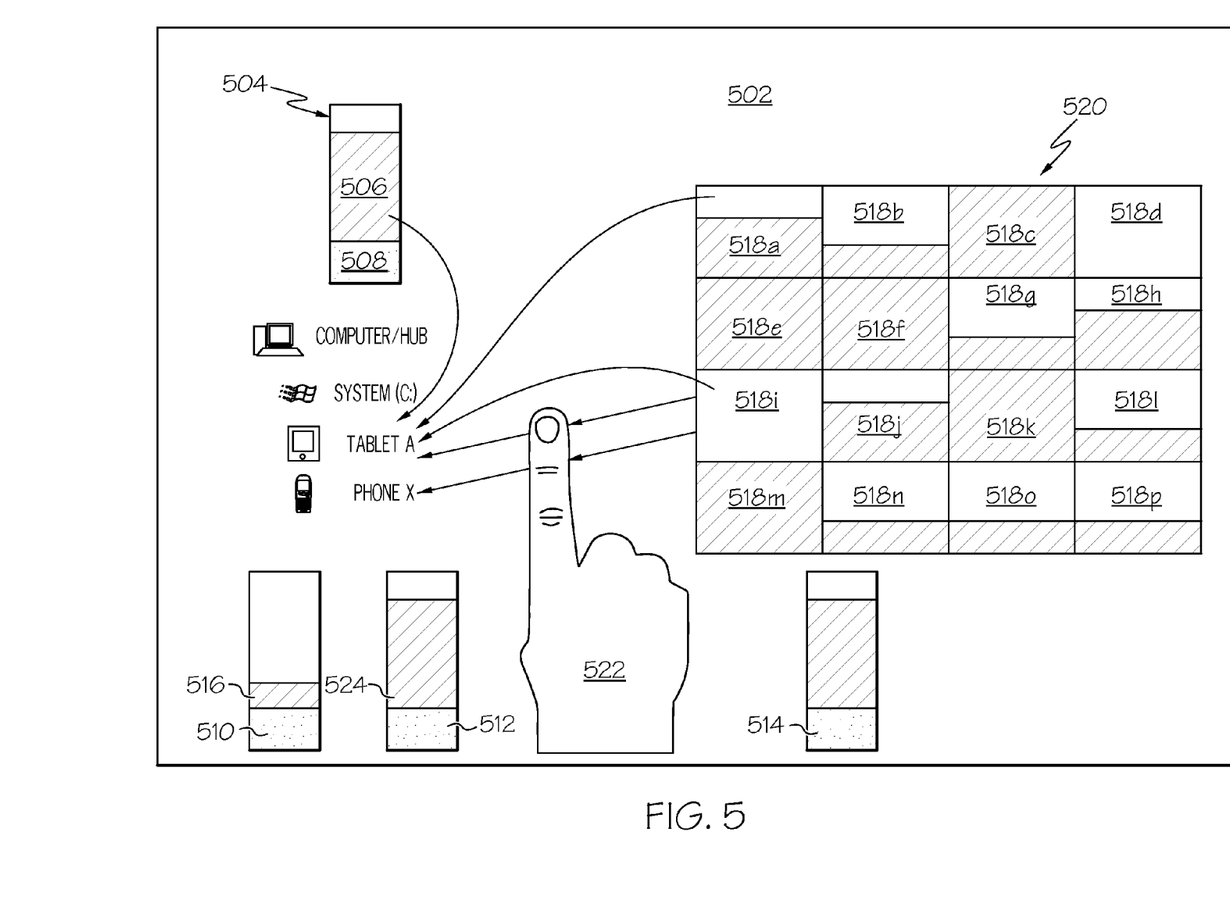
FIG. 5 illustrates an exemplary user interface that allows power to be allocated to one or more battery-powered electronic devices.

With reference now to FIG. 5, an exemplary user interface that allows power to be allocated to one or more battery-powered electronic devices is presented. In one embodiment, user interface 502 is displayed on a display (e.g., display 110 shown in FIG. 1) on the power hub 204 depicted in FIG. 2. User interface 502 includes a battery supply indicator 504, which graphically depicts how much power (i.e., amp-hours) is available for redistribution to one or more battery-powered electronic devices. This amount of power is graphically represented by zone 506 in the battery supply indicator 504. In one embodiment, assume that the source of this power is from a dedicated charging battery, such as the dedicated charging battery 206 shown in FIG. 2. As described herein, dedicated charging battery 206 is simply a portable battery, which is available to one or more battery-powered electronic devices to recharge their local batteries. In this embodiment, the battery supply indicator 504 merely shows how much power remains within the dedicated charging battery 206. In one embodiment, there is still a reserve power (indicated by zone 508) that is to remain untouched unless there is an emergency. For example, power depicted by zone 508 is unavailable for use by the electronic devices 202a-202n shown in FIG. 2, unless an emergency override signal is sent to the dedicated charging battery 206. Examples of emergencies that may warrant accessing the power depicted by zone 508 include providing power to a portable medical device (e.g., an Automatic External Defibrillator—AED), emergency GPS signal alerts, etc.

Continuing with FIG. 5, the user interface 502 also shows how much power is currently available on various battery-powered electronic devices. For example, continue to assume that user interface 502 is shown on power hub 204, and that the battery supply indicator 504 shows how much power (amp-hours) are available from the dedicated charging battery 206 shown in FIG. 2. This power availability from the dedicated charging battery 206 is represented by zone 506. Furthermore, the available power in the batteries of various battery-powered electronic devices are also shown on the user interface 502 from the power hub 204. For example, assume that the electronic devices 202a-202n include a laptop computer ("System (C:)"), a tablet computer ("Tablet A"), and a cell phone ("Phone X"). The amount of power in the battery in System (C:) is shown in battery supply indicator 510; the amount of power in the battery in Tablet A is shown in battery supply indicator 512; and the amount of power in the battery in Phone X is shown in battery supply indicator 514. Thus, in one embodiment, power can be transferred to a particular device by simply dragging the icon shown in zone 506 to a preferred battery-powered electronic device (e.g., by the user moving his/her finger across a touchscreen, moving a cursor across a traditional screen, etc.). For example, available power (represented in zone 506) from the dedicated charging battery 206 can be dragged from zone 506 to the icon representing Tablet A, as depicted in FIG. 5. The choice of which battery-powered electronic device receives the power from the dedicated charging battery 206 can be made arbitrarily by the user, or may be based on various rules described herein (e.g., time required to transfer power, priority of tasks, etc.).

Continuing with FIG. 5, in one embodiment the user interface 502 is presented on a computer that has its own tasks running. For example, assume that electronic device 202a shown in FIG. 2 is actually a laptop computer ("System (C:)"), which is electrically coupled to a tablet computer (e.g., "Tablet A"— depicted as electronic device 202b in FIG. 2) and a cell phone (e.g., "Phone X"—depicted as electronic device 202n in FIG. 2). Assume again that the amount of power remaining in System (C:) is still depicted in battery supply indicator 510, but now the represented available power (see zone 516) is the power that System (C:) will have after executing all of its pending tasks 518a-518p (depicted in cells 520). As shown by the low level of available power by battery supply indicator 510, System (C:) is hardly in a position to send power to Tablet A or Phone X, both of which have more battery-stored power than System (C:). For example, zone 524 (indicating how much power is available in the battery in Tablet A) from battery supply indicator 512 is much greater than zone 516 (indicating how much power is available in the battery in System (C:)). Nonetheless, assume that System (C:) is being called upon to provide additional electricity (electrons, amp-hours) to Tablet A. System (C:) must then forego executing one or more tasks, in order to have enough power to send to Tablet A or Phone X. In order to make such power available, System (C:) must forego execution of one or more of the pending (and/or currently executing) tasks 518a-518p. As indicated in FIG. 5, task 518i has not begun. Assuming that task 518i is not a top priority for the user of System (C:), the user can forego execution of task 518i, and reallocate the power that task 518i would have used to Tablet A. Thus, by dragging the representation of task 518i to the representation of Tablet A, as indicated by the movement of a user's hand 522, System (C:) will 1) stop execution of task 518i, and 2) send the power that was previously allocated to execute task 518i to Tablet A.

As further depicted in FIG. 5, in one embodiment unused power that has been allocated to a partially executed task may also be appropriated. For example, assume that task 518a is only partially completed, such that there is still power that has been allocated for its completion. The unused (but allocated) power to complete task 518a may be allocated to Tablet A as well. Thus, by dragging the icon for task 518a to Tablet A (as depicted in FIG. 5), 1) task 518a will be abandoned (execution stopped), and 2) the remaining, allocated, but unused power for task 518a is transferred to Tablet A.

Figure 6:
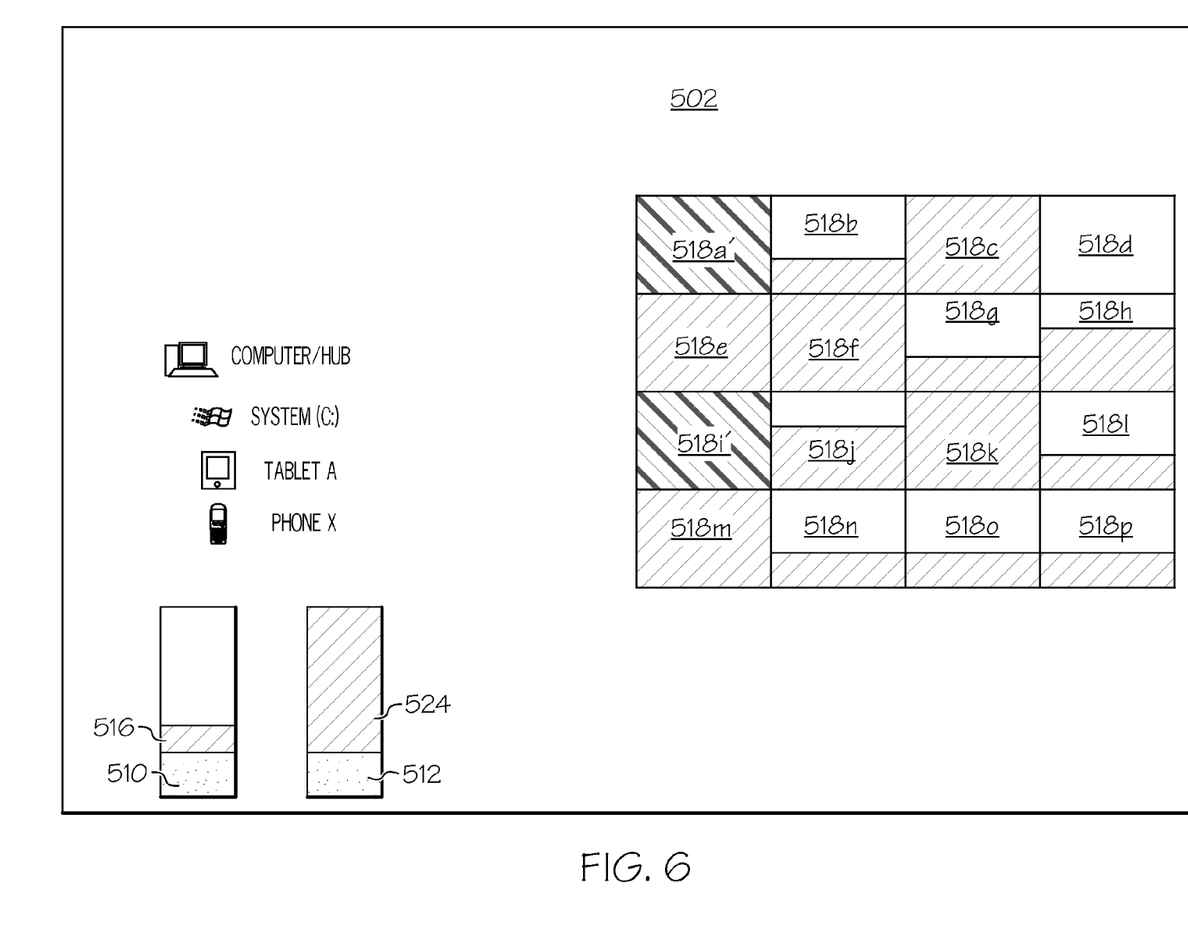
FIG. 6 depicts the user interface shown in FIG. 5 after the battery-powered electronic device has sent battery power to another battery-powered electronic device.

After stored power is transferred from System (C:) to Tablet A, the appearance of user interface 502 in System (C:) changes. For example, as shown in FIG. 6, zone 516 in the battery supply indicator 510 for System (C:) has gotten smaller, and zone 524 in the battery supply indicator 512 for Tablet A has gotten larger, indicating the transfer of battery power (direct current electricity) from System (C:) to Tablet A. Note further in FIG. 6 that the cells representing tasks 518a and 518i (now depicted respectively as tasks 518a' and 518i') are shown shaded out, indicating that they have been halted.

Returning again to FIG. 3, block 312 depicts the process of distributing, by a power distribution hardware controller, available amp-hours from the battery source to one or more of the battery-powered devices based on the priority of the tasks. That is, assume that a power distribution hardware controller (e.g., power distribution controller 122 shown in FIG. 1) is either part of the power hub 204 or one or more of the electronic devices 202a-202n shown in FIG. 2. This hardware device (power distribution controller 122) distributes available amp-hours, either from a dedicated charging battery (e.g., dedicated charging battery 206 shown in FIG. 2) or from one of the batteries 218a-218n in the electronic devices 202a-202n shown in FIG. 2.

The flow chart shown in FIG. 3 ends at terminator block 314.

Thus, as described herein, in one embodiment of the present invention, the available amp-hours are distributed to a specific battery-powered device from a dedicated charging battery. Similarly, in one embodiment of the present invention, the available amp-hours are distributed to a specific battery-powered device from the multiple battery-powered devices.

Figure 7:
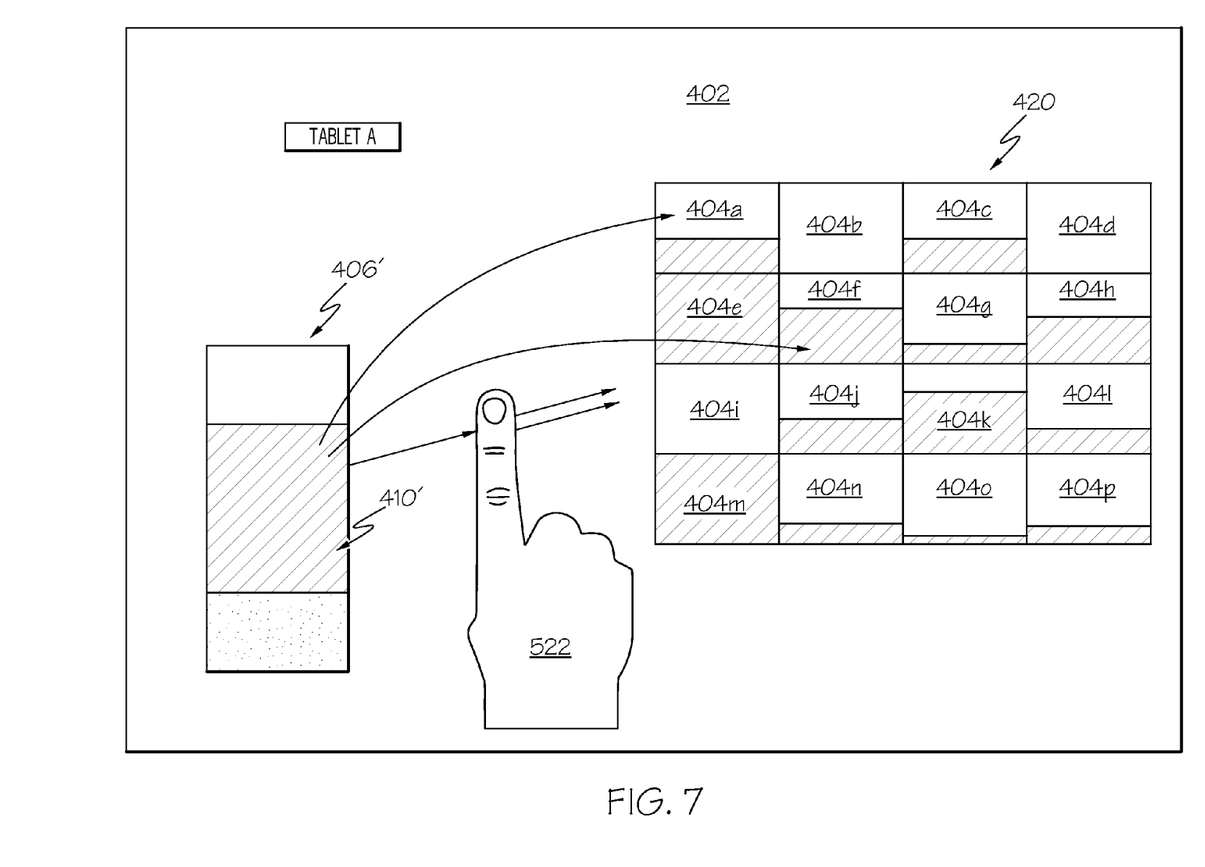
FIG. 7 illustrates an exemplary user interface that allocates power, from a newly-recharged local battery, to one or more tasks on a battery-powered electronic device.

As described herein, in one embodiment of the present invention, a hardware receiver receives a user-input from a user of a specific battery-powered device, wherein the user-input identifies which tasks, from multiple pending tasks, are to be selected for completion on the specific battery-powered device. For example, consider now FIG. 7. The user interface 402 (also shown in FIG. 4) again depicts the battery power indicator 406, indicating how much power is available to the battery within Tablet A. Now however, the amount of power available from that battery (see zone 410') is much greater than before (see zone 410 in FIG. 4), since additional battery power has been transferred to the battery within Tablet A. Assume further that Tablet A does not have enough power to complete all of the tasks depicted in cells 420. Thus, the user of Tablet A can now manually select which tasks will receive some or all of this additional power, such that the selected tasks are able to be completed. In one embodiment, this power is allocated to a particular task by (the user's hand 522) dragging from zone 410' to one or more of the tasks depicted in cells 420 (e.g., tasks 404a and 404f).

In one embodiment of the present invention, tasks selected to be completed on the specific battery-powered device are limited to tasks performed that are currently open and running on the specific battery-powered device. In another embodiment, however, tasks on the battery-powered electronic device are predicted future tasks. That is, in one embodiment of the present invention, one or more processors predicts tasks to be completed based on a user history of the specific battery-powered device. For example, if a particular user has a history of using a GPS-enabled route finder on his smart phone twice a day, then a prediction can be made that this same user will once again use the GPS-enabled route finder twice in the current day. Thus, in one embodiment tasks selected to be completed on the specific battery-powered device can be limited to tasks (e.g., using the GPS-enabled route finder) that are predicted to be completed based on the user history.

In one embodiment of the present invention, one or more processors predicts tasks to be completed based on a user calendar of upcoming tasks to be performed on the specific battery-powered device. In this embodiment, tasks selected to be completed on the specific battery-powered device are limited to upcoming tasks that are calendared on the user calendar.

In one embodiment of the present invention, a determination is made of how long (i.e., the length of time required) will be needed to distribute the available amp-hours to a first battery-powered device and to a second battery-powered device. In this embodiment, a power distribution hardware controller selectively distributes the available amp-hours from the battery source to the first battery-powered device or the second battery-powered device based on the length of time required to distribute the available amp-hours to the first battery-powered device and to the second battery-powered device. For example, assume that, due to bandwidth restrictions in the I/O, connections, etc., it would take 10 minutes to transfer one amp-hour from the dedicated charging battery 206 to the electronic device 202a shown in FIG. 2. Furthermore and due to similar factors/parameters, it would take only 2 minutes to transfer one amp-hour from the dedicated charging battery 206 to the electronic device 202b shown in FIG. 2. Thus, the battery power is transferred to electronic device 202*b* instead of electronic device 202*a*, since this is more time-efficient.

In one embodiment of the present invention, one or more processors determines an amount of existing power already present in a first battery-powered device and in a second battery-powered device. A power distribution hardware controller then selectively distributes the available amp-hours from the battery source to the first battery-powered device or the second battery-powered device based on the amount of existing power already present in the first battery-powered device and in the second battery-powered device, wherein a battery-powered device with a lower amount of existing power as compared with another battery-powered device will receive the available amp-hours before said another battery-powered device. For example, as shown in FIG. 5, System (C:) has much less available power in its battery (as indicated by battery supply indicator 510) than Tablet A (as indicated by battery supply indicator 512). Thus, System (C:) will receive power from the dedicated charging battery 206 before Tablet A.

In one embodiment of the present invention, one or more processors determines the priority of the tasks based on completion levels, wherein a task that is closer to completion is allocated available amp-hours before a task that is relatively further from completion. For example, consider again FIG. 7. As indicated in the cells 420, task 404*k* is almost complete, while task 404*n* has just begun. As such, power will be allocated to complete task 404*k* over task 404*n*, since a greater amount of time/work/processing for task 404*k* is at risk if it does not get the needed additional power from the external battery power source.

In one embodiment of the present invention and as described herein, one or more processors establishes a level of importance to each of the multiple pending tasks on the battery-powered devices. For example, getting directions to a local hospital may be deemed more important than checking postings on a social network website. Thus, the priority of the tasks to be performed (and thus have power allocated to) is based on the level of importance of each of the multiple pending tasks on the battery-powered devices.

In one embodiment of the present invention and as described herein, the battery source is a dedicated charging battery.

In one embodiment of the present invention and as described herein, the battery source is the battery(s) from one or more power-supplying battery-powered electronic devices from the multiple battery-powered electronic devices. In a further embodiment, a signal describing an amount of remaining available amp-hours and remaining tasks to be completed within each of the one or more power-supplying battery powered electronic devices is received from the one or more power-supplying battery powered electronic devices. The power distribution hardware controller then pulls amp-hours from the one or more power-supplying battery powered electronic devices based on the amount of remaining available amp-hours and remaining tasks to be completed within each of the one or more power-supplying battery powered electronic devices.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of sharing power between multiple battery-powered electronic devices, the method comprising:
   determining, by one or more processors, which tasks, from multiple pending tasks being performed on different battery-powered electronic devices from multiple battery-powered electronic devices, are to be selected for completion;
   determining, by one or more processors, a power requirement for each of the tasks that have been selected for completion;
   determining, by one or more processors, a priority of the tasks, from the multiple pending tasks on the multiple battery-powered electronic devices, that have been selected for completion;
   calculating, by one or more processors, a quantity of amp-hours that are available to charge batteries on the multiple battery-powered electronic devices; and
   distributing, by a power distribution hardware controller, available amp-hours from a battery source in a first battery-powered electronic device from the multiple battery-powered electronic devices to a second battery-powered electronic device from the multiple battery-powered electronic devices based on the priority of the tasks via a user selection on a graphical user interface (GUI) on the first battery-powered electronic device, wherein the second battery-powered electronic device is capable of transferring power to the first battery-powered electronic device, wherein the tasks selected for completion include a first task currently running on the first battery-powered electronic device and a second task currently running on the second battery-powered electronic device, wherein the second task is assigned a higher priority than the first task in response to a determination that the second task is closer to completion than the first task, wherein the user provides a signal on the GUI for cessation of execution of the first task to transfer an amount of power that was remaining from an initial power allocation for the first task from the first battery-powered electronic device to the second battery-powered electronic device in order to complete the second task.

2. The method of claim 1, wherein the available amp-hours are distributed to a specific battery-powered electronic device, wherein the specific battery-powered electronic device is from the multiple battery-powered electronic devices.

3. The method of claim 2, further comprising:
   receiving, by a hardware receiver, a user-input from a user of the specific battery-powered electronic device, wherein the user-input identifies which tasks, from multiple pending tasks, are to be selected for completion on the specific battery-powered electronic device.

4. The method of claim 2, further comprising:
   limiting, by one or more processors, tasks selected to be completed on the specific battery-powered electronic device to tasks that are performed by currently open and running applications on the specific battery-powered electronic device.

5. The method of claim 2, further comprising:
predicting, by one or more processors, tasks to be completed based on a user history of the specific battery-powered electronic device; and
limiting, by one or more processors, tasks selected to be completed on the specific battery-powered electronic device to tasks that are predicted to be completed based on the user history.

6. The method of claim 2, further comprising:
predicting, by one or more processors, tasks to be completed based on a user calendar of upcoming tasks to be performed on the specific battery-powered electronic device; and
limiting, by one or more processors, tasks selected to be completed on the specific battery-powered electronic device to upcoming tasks that are calendared on the user calendar.

7. The method of claim 1, further comprising:
determining, by one or more processors, a length of time required to distribute the available amp-hours from the first battery-powered electronic device to the second battery-powered electronic device and a third battery-powered electronic device from the multiple battery-powered electronic devices; and
selectively distributing, by the power distribution hardware controller, the available amp-hours from the battery source in the first battery-powered electronic device to the second battery-powered electronic device or the third battery-powered electronic device based on the length of time required to distribute the available amp-hours from the first battery-powered electronic device to the second battery-powered electronic device or the third battery-powered electronic device, wherein the length of time required is based on power-transfer physical limitations of physical power connections and bandwidth limitations from the first battery-powered electronic device to the second battery-powered electronic device and the third battery-powered electronic device, wherein a power connection to the second battery-powered electronic device has greater power-transfer physical limitations than a power connection to the third battery-powered electronic device, wherein the second battery-powered electronic device and the third battery-powered electronic device are both capable of receiving the available amp-hours, and wherein the third battery-powered electronic device receives the available amp-hours before the second battery-powered electronic device.

8. The method of claim 1, further comprising:
determining, by one or more processors, an amount of existing power already present in the second battery-powered electronic device and in a third battery-powered electronic device from the multiple devices; and
selectively distributing, by the power distribution hardware controller, the available amp-hours from the battery source in the first battery-powered electronic device to the second battery-powered electronic device or the third battery-powered electronic device based on the amount of existing power already present in the second battery-powered electronic device and in the third battery-powered electronic device, wherein a battery-powered electronic device with a lower amount of existing power as compared with another battery-powered electronic device will receive the available amp-hours before said another battery-powered electronic device.

9. The method of claim 1, further comprising:
determining, by one or more processors, the priority of the tasks based on completion levels, wherein a task that is closer to completion is allocated available amp-hours before a task that is relatively further from completion.

10. The method of claim 1, further comprising:
establishing, by one or more processors, a level of importance for each of the multiple pending tasks on the multiple battery-powered electronic devices; and
determining, by one or more processors, the priority of the tasks based on the level of importance of each of the multiple pending tasks on the multiple battery-powered electronic devices.

11. The method of claim 1, wherein a battery source is from one or more power-supplying battery-powered electronic devices from the multiple battery-powered electronic devices, and wherein the method further comprises:
receiving, from the one or more power-supplying battery powered electronic devices, a signal describing an amount of remaining available amp-hours and remaining tasks to be completed within each of the one or more power-supplying battery powered electronic devices; and
pulling, by the power distribution hardware controller, amp-hours from the one or more power-supplying battery powered electronic devices based on the amount of remaining available amp-hours and the remaining tasks to be completed within each of the one or more power-supplying battery powered electronic devices.

12. The method of claim 1, further comprising:
displaying, by one or more processors, a representation on a user interface that depicts an amount of power needed to complete each task from the multiple pending tasks running on the different battery-powered electronic devices
wherein a power transfer is caused by the user dragging a representation of the first task to a representation of the second battery-powered electronic device on the GUI, and wherein the transference of the amount of power that is needed to complete the second task is performed in response to the user dragging the representation of the first task to the representation of the second battery-powered electronic device.

13. The method of claim 1, further comprising:
displaying, on a user interface, a battery supply indicator that depicts a total amount of power that is available for redistribution among the multiple battery-powered electronic devices.

14. The method of claim 1,
wherein the signal from the user is caused by the user dragging a representation of the first task to a representation of the second battery-powered electronic device on the GUI, and wherein the transference of the amount of power that is needed to complete the second task is performed in response to the user dragging the representation of the first task to the representation of the second battery-powered electronic device.

15. The method of claim 1, further comprising:
determining, by the power distribution hardware controller, a length of time required to distribute the available amp-hours from the first battery-powered electronic device to the second battery-powered electronic device and a third battery-powered electronic device from the multiple battery-powered electronic devices; and selectively distributing, by the power distribution hardware controller, the available amp-hours from the battery source in the first battery-powered electronic device to the second battery-powered electronic device or the third battery-powered electronic device based on the length of time required to distribute the available amp-hours from the first battery-powered electronic device to the second battery-powered electronic device or the third battery-powered electronic device, wherein the length of time required is based on power-transfer physical limitations of power connections from the first battery-powered electronic device to the second battery-powered electronic device and the third battery-powered electronic device, wherein a power connection to the second battery-powered electronic device has greater power-transfer physical limitations than a power connection to the third battery-powered electronic device, wherein the second battery-powered electronic device and the third battery-powered electronic device are both capable of receiving the available amp-hours, and wherein the third battery-powered electronic device receives the available amp-hours before the second battery-powered electronic device.

16. The method of claim 1, further comprising:

determining, by the power distribution hardware controller, that the battery source in the first battery-powered electronic device has less than a predetermined amount of stored electrical power; and in response to determining that the battery source in the first battery-powered electronic device has less than the predetermined amount of stored electrical power, blocking, by the power distribution hardware controller, any further transfer of electrical power from the first battery-powered electronic device to the second battery-powered electronic device.

17. The method of claim 16, wherein the second battery-powered electronic device is an automatic external defibrillator (AED), and wherein the method further comprises:

overriding, by the power distribution hardware controller, said blocking in order to allow the first battery-powered electronic device to transfer power to the AED.

18. The method of claim 1, further comprising:

transferring, by the power distribution hardware controller, electrical power from a plurality of battery-powered electronic devices from the multiple battery-powered electronic devices to the second battery-powered electronic device.

19. The method of claim 1, further comprising:

predicting, by one or more processors and based on a history of tasks performed by a user on the second battery-powered electronic device, a task to be performed for the user on a current day, wherein the second battery-powered electronic device uses a predetermined amount of electrical power to perform the task; and transferring, during the current day and by the power distribution hardware controller, the predetermined amount of electrical power from the first battery-powered electronic device to the second battery-powered electronic device in order to ensure that the second battery-powered electronic device has sufficient electrical power to perform the task.

* * * * *